US005631815A

United States Patent [19]
Cross

[11] Patent Number: 5,631,815
[45] Date of Patent: May 20, 1997

[54] HIGH VOLTAGE POWER SUPPLY

[76] Inventor: James D. Cross, 41 Allen Street East, Waterloo, Ontario, Canada, N2J 1J1

[21] Appl. No.: 570,918

[22] Filed: Dec. 12, 1995

[51] Int. Cl.$^6$ .............................. H02M 3/18; H02M 7/00
[52] U.S. Cl. ................... 363/68; 363/59; 315/411
[58] Field of Search ..................... 363/17, 59, 68, 363/97, 125; 315/411

[56] References Cited

U.S. PATENT DOCUMENTS

| | | | |
|---|---|---|---|
| 3,745,440 | 7/1973 | Lord | 323/48 |
| 4,266,269 | 5/1981 | Toba | 363/68 |
| 4,274,136 | 6/1981 | Onodera et al. | 363/68 |
| 4,338,657 | 7/1982 | Lisin et al. | 363/68 |
| 4,545,005 | 10/1985 | Mudde | 363/68 |
| 4,587,606 | 5/1986 | Sanada | 363/68 |
| 4,816,978 | 3/1989 | Domenget et al. | 363/21 |
| 4,858,098 | 8/1989 | Vincent | 363/45 |
| 4,977,491 | 12/1990 | Domenget et al. | 363/15 |
| 5,003,452 | 3/1991 | Sireul et al. | 363/68 |
| 5,023,768 | 6/1991 | Collier | 363/68 |
| 5,060,128 | 10/1991 | Onodera et al. | 363/20 |
| 5,166,965 | 11/1992 | Collier | 378/101 |
| 5,428,272 | 6/1995 | George et al. | 315/411 |
| 5,430,341 | 7/1995 | Summer | 363/68 |
| 5,515,259 | 5/1996 | Stephenson | 363/59 |

*Primary Examiner*—Stuart N. Hecker
*Attorney, Agent, or Firm*—Ridout & Maybee

[57] ABSTRACT

A power supply for producing a high DC output voltage. The power supply comprises a primary winding and a secondary winding coupled together by a magnetic circuit. The secondary winding comprises a series of independent coils or turns. Each coil includes a rectifier element for converting the induced AC voltage into a DC voltage. The rectifier elements are connected in series to produce a high level DC voltage output signal, for example, a minimum 50 kV output. The secondary coils have a turns ratio such that the induced voltage is less than the Paschen minimum voltage for the gaseous medium surrounding the secondary coils. The power supply may be fabricated using surface mount technology or as a printed circuit board where the secondary coils are formed as tracks on the substrate.

20 Claims, 6 Drawing Sheets

HIGH VOLTAGE POWER SUPPLY

FIELD OF THE INVENTION

The present invention relates to high voltage power supplies, and more particularly to a device for generating a high DC output voltage by inductively coupling energy from a low voltage AC source to a series of secondary coils having a low number of turns.

BACKGROUND OF THE INVENTION

Conventional high voltage DC sources rely upon inductive coupling of energy from a low voltage AC source to secondary coils which include a rectifier assembly for rectifying the AC voltage to produce a DC output. The increase in output voltage level is achieved by the transformer principle, i.e. the low voltage AC source is connected to a primary coil having a small number of turns and the rectifying components are connected to a secondary coil having a large number of turns. The inductive coupling in the high turns ratio secondary increases or "steps-up" the voltage to the high output level.

The development of high frequency solid state switching devices has made it possible to reduce the size of high voltage DC power supplies through the generation of high frequency alternating voltages for the transformer and rectifier stage. However to operate at frequencies of 100 kHz and above it is necessary to use different geometries than those used at low frequencies. The modified geometries are necessary because the stray, i.e. parasitic, impedances of the high voltage secondary winding are reflected to the low voltage primary winding and thereby to the AC source. The reflected impedances are relevant for high frequency operation because they limit the use of conventional transformers to frequencies of 10 kHz or less.

In the art, Collier (U.S. Pat. No. 5,166,965) has developed a high voltage DC power supply that overcomes some of the problems associated with operating at frequencies of 100 kHz and above. Problems however remain with the power supply disclosed by Collier. First, a high voltage supply as taught by Collier that relies on an increase in the voltage by transformer action will have inherent electrical insulation problems. A high AC voltage can produce partial discharges, or corona, in the voids and defects in the solid insulation material of the secondary winding. These discharges progressively damage the insulation and eventually lead to electrical breakdown. The problem is exacerbated by high frequency operation. As the frequency of operation is increased, the number of discharges per second in the voids or defects increases in proportion to the frequency. Therefore, for operation at frequencies of 100 kHz or higher, solid insulation can experience a very high number of partial discharges making it very susceptible to damage. Furthermore, high voltage AC electrical fields created by high AC voltages on the secondary side lead to dielectric heating of the insulating solids and liquids. This heating can also cause voids in the solids and bubbles in the liquids and also chemical deterioration in both the solid and liquid insulation. These damaging effects arising from high AC voltage on the secondary severely limit the life of high voltage DC sources operating at high frequencies. In order to avoid early failure, it is necessary to employ costly manufacturing techniques and construct insulation with relatively large spacing between the components.

Another problem encountered with conventional high frequency DC power supplies such as taught by Collier is that operating a DC source with a supply frequency of 100 kHz requires the rectification to be carried out with ultra-fast rectifying diodes having a recovery time in the order of a few tens of nanoseconds. Collier makes use of multiple coils each with its own rectifying element, and very high output voltages are produced by adding coil voltages of a few kilovolts each. While Collier's design has the advantage of reducing the rating of the rectifying diodes to a few kilovolts and thereby making the design suitable for implementation, there are still a very limited range of diodes which are suitable for the Collier configuration. It would appear that in fact there is only one type of diode produced by one manufacturer which will allow the Collier power supply to operate as intended. Unfortunately, such diodes are costly, and the single source of such components can jeopardize the commercial viability of such a high voltage DC source.

A third problem encountered with the high voltage DC power supply disclosed by Collier concerns the parasitic impedances which are reflected from the secondary winding into the primary winding. Although Collier uses a relatively small turns ratio, the parasitic impedances of the secondary winding are still significant when reflected into the primary.

The present invention overcomes all of these disadvantages. The present invention comprises a device which produces a high DC output voltage by inductively coupling energy from a low voltage AC source to a series of secondary coils having a low number of turns, in most applications one turn only, and rectifying the AC voltage on each secondary coil to generate a DC voltage. The DC voltages are connected in series to produce the required high voltage DC output.

BRIEF SUMMARY OF THE INVENTION

According to the invention, the number of turns in a secondary coil is no more than required to produce a voltage which is less than the Paschen minimum voltage for the gas adjacent or surrounding the secondary coil. Gaseous material may also be trapped in voids, e.g. as bubbles, or defects in dielectric material applied to secondary coils and thereby provide a vehicle for partial discharge or corona. The Paschen minimum voltage is the minimum voltage required to produce a gas discharge. For example, the Paschen minimum voltage for air is 385 volts. For other gases such as oxygen, sulphur hexafluoride, and carbon dioxide, the Paschen minimum voltage is 450 volts, 507 volts and 420 volts, respectively. When the AC voltage is below the Paschen minimum, partial discharge is impossible. Therefore, a power supply according to the present invention does not suffer from insulation degradation due to partial discharges. A further advantage arising from the generation of low voltages in the secondary coils is that dielectric heating becomes insignificant.

In another aspect, a high voltage supply according to the present invention utilizes low voltage solid state components for the rectifying elements. By limiting the AC voltages to below the Paschen minimum voltage, e.g. 385 volts for air, low cost diodes can be used which are both fast and reliable, thereby avoiding problems associated with the design of Collier.

Another advantage arising from the arrangement of the present invention is improved cooling provided by the low voltage diodes. Low voltage diodes are inherently better cooled because each diode junction has its own pair of leads. It is through the leads that diodes lose most of the heat generated across the junction. In designs utilizing high voltage diodes, for example Collier, the high voltage diode junctions are stacked in series in one insulating package. The inner junctions can only lose heat by conduction through the outer junctions, which is a very inefficient path. The result is that high voltage diodes have severe limitations on current carrying capacity. The arrangement according to the present invention on the other hand provides a low cost high voltage DC power supply capable of operating at several amperes of output current.

Yet another advantage of the high voltage power supply according to the present invention is the reduction of the influence of parasitic capacitances.

In a first aspect, the present invention provides an apparatus for generating a DC output voltage in an environment subject to inclusion of a gaseous medium having a Paschen minimum voltage level and wherein the DC output voltage is substantially greater than the Paschen minimum voltage for the medium, said apparatus comprising: (a) a primary winding having an input port for receiving an alternating voltage; (b) a secondary winding inductively coupled to said primary winding; (c) induction means coupled to said primary and secondary windings for inducing a voltage in said secondary winding in response to excitation of said primary winding by said alternating voltage; (d) said secondary winding comprising a plurality of coils and each of said coils having a turns ratio for producing an induced voltage less than the Paschen minimum voltage; (e) a rectifier element connected to each of said coils for converting said induced voltage into a DC voltage component; and (f) said rectifier elements being coupled to produce a DC output voltage by summing a plurality of said DC voltage components.

In a second aspect, the present invention provides an apparatus for generating a DC output voltage in an environment subject to inclusion of a gaseous medium having a Paschen minimum voltage level, said apparatus comprising: (a) a primary winding having an input port for receiving an alternating voltage; (b) a secondary winding inductively coupled to said primary winding; (c) a planar member; (d) induction means coupled to said primary and secondary windings for inducing a voltage in said secondary winding in response to excitation of said primary winding by said alternating voltage, said induction means being located on a surface of said planar member; (e) said secondary winding comprising a plurality of coils formed on a surface of said planar member, and each of said coils having a turns ratio for producing an induced voltage no more than the Paschen minimum voltage; (f) a rectifier element connected to each of said coils for converting said induced voltage into a DC voltage component; and (g) said rectifier elements being coupled to produce at an output port a DC output voltage by summing a plurality of said DC voltage components.

In a third aspect, the present invention provides an apparatus for generating a DC output voltage in an environment subject to inclusion of a gaseous medium having a Paschen minimum voltage level, said apparatus comprising: (a) a substrate; (b) a plurality of coils formed on a surface of said substrate; (c) said substrate including means for attaching a magnetic core having a primary winding for inductively coupling to said coils so that a voltage is induced in said coils in response to excitation of said primary winding by an alternating voltage; (d) each of said coils having a turns ratio wherein said induced voltage is no more than the Paschen minimum voltage; (e) a rectifier element connected to each of said coils for converting said induced voltage into a DC voltage component; and (f) said rectifier elements being coupled to produce a DC output voltage at an output port by summing a plurality of said DC voltage components.

BRIEF DESCRIPTION OF THE DRAWINGS

Reference will now be made, by way of example, to the accompanying figures, which show a preferred embodiment of the present invention, and in which.

DETAILED DESCRIPTION OF THE PREFERRED EMBODIMENTS

Figure 1:
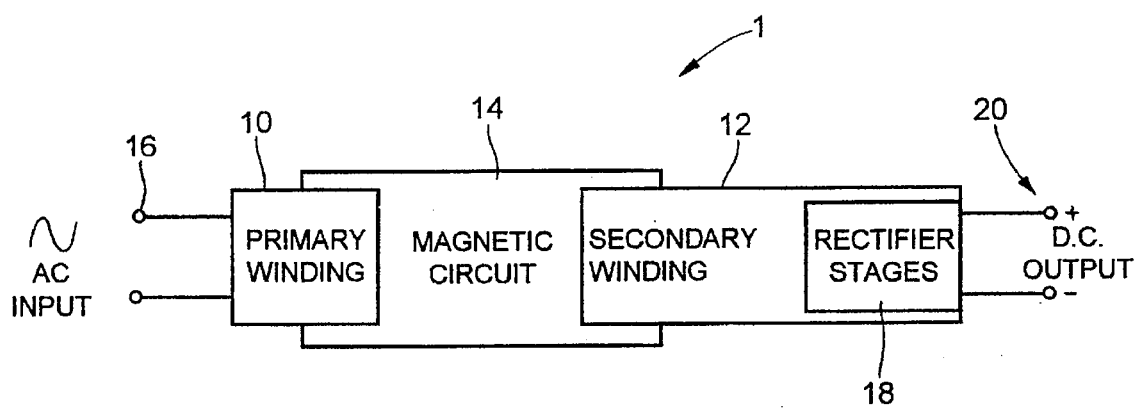
FIG. 1 is a block diagram of a high voltage power supply according to the present invention.

Referring to FIG. 1, a high voltage power supply 1 according to the present invention comprises a primary winding 10 which is coupled to a secondary winding 12 through a magnetic circuit 14. The primary winding 10 has an input port 16 for connecting to an AC voltage source. The AC input voltage is inductively coupled to the secondary windings 12 through the magnetic circuit 14. The secondary windings 12 include a rectifier stage 18 which rectifies the inductively coupled AC voltage to produce a DC output voltage at an output port 20.

The primary winding 10 may comprise a helical or planar arrangement. The magnetic circuit 14 comprises a magnetic core of any form that permits the passage of flux through to the secondary winding 12. The alternating magnetic flux is produced in the magnetic circuit 14 by connecting a relatively low voltage AC supply to the primary winding 10. A frequency of 100 kHz or above is preferred for the AC supply, but a lower frequency is also possible. The AC supply is of conventional type, for example, resonant inverter, switched inverter or pulse width modulated designs are suitable.

Figure 2:
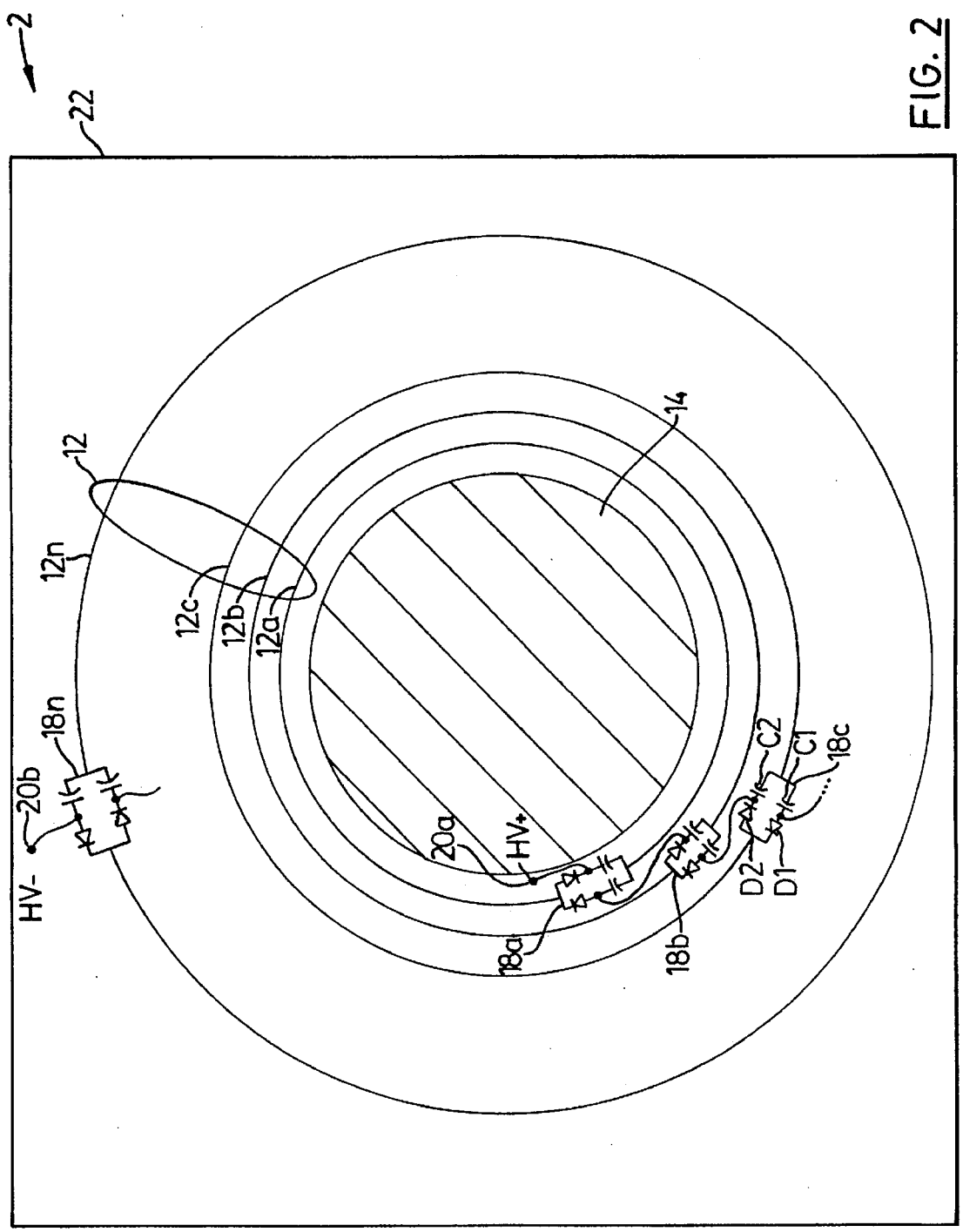
FIG. 2 is a schematic diagram of an embodiment of the high voltage supply of FIG. 1.

Reference is next made to FIG. 2 which shows an embodiment of the high voltage power supply of FIG. 1. The high voltage power supply is denoted generally by 2. The power supply 2 is mounted on a substrate board 22, for example a printed circuit board (PCB) or other substrate utilizing, for example, surface mount technology. The magnetic circuit 14 comprises a suitable magnetic flux pole as will be understood by those skilled in the art. The secondary winding 12 comprises a series of single-turn coils 12a, 12b, 12c to 12n having a 1:n turns ratio, where n is the number of turns on the primary winding. The secondary coils 12a to 12n may comprise any single turn conductor. In this embodiment single turn tracks formed on the PCB substrate 22 are preferred. The primary winding (not shown) is wrapped around the magnetic flux pole 14. The AC voltage applied to the input port (not shown) produces an alternating flux in the magnetic pole 14 which induces a voltage in the secondary winding, i.e. coils 12a to 12n. The secondary coils 12a to 12n are mounted on the substrate 22 so that the magnetic flux generated in the flux pole 14 passes through the secondary coils 12a to 12n. According to the invention, conventional coatings applied to the tracks on the printed circuit board 22 forming the secondary coils 12 are suitable to provide electrical insulation.

It is a principle feature of the present invention that low AC voltages are generated in the secondary coil. According to the invention, the number of turns used for each secondary coil 12a to 12n is no more than that required to produce a voltage less than the Paschen minimum voltage for the gas surrounding the device. For air, the Paschen minimum voltage is 385 Volts, and gas inclusions other than air found in apparatus of this nature are unlikely to exhibit a Paschen minimum voltage much less than this. Thus a preferable maximum voltage in the secondary coil of 300 Volts is appropriate. The generation of such voltage levels makes it possible to use low voltage, low cost components in the rectifier stages, and also to utilize secondary coils comprising conductors with low value insulation and high current ratings. This in turn leads to reduced cost and several significant improvements and advantages as described below.

As shown in FIG. 2, each secondary winding coil 12a to 12n includes a respective rectifier stage or element 18a, 18b, 18c to 18n. Preferably, each rectifier stage comprises a pair of diodes D1, D2 connected to a pair of capacitors C1, C2 to form a voltage doubler circuit as will be within the knowledge of one skilled in the art. The diodes D1, D2 are selected to have sufficient current capacity to carry the load current and a sufficient voltage capacity to withstand the AC voltages induced in the secondary. The capacitors C1, C2 are selected according to the ripple reduction desired in the rectified AC.

According to the invention, the low voltages generated in a secondary coil, i.e. below the Paschen minimum voltage, permit the use of low voltage components for the diodes D1, D2. The use of such components results in significant cost savings for the power supply 10 when compared to known devices such as Collier. Another advantage arising from the arrangement of the present invention is improved cooling from the utilization of low voltage diodes. Low voltage diodes are inherently better cooled because each diode junction has its own pair of leads as compared to typical high voltage diode devices which comprise multiple diode junctions per package.

Referring to FIG. 2, the rectifier stages 18a, 18b, 18c to 18n are connected in series to produce the high voltage DC output. The first rectifier stage 18a provides the positive terminal 20a for the output port 20, while the nth rectifier stage 18n provides the negative terminal 20b. The polarity of the output port 20 is reversed by switching connections to the first and nth rectifier stages 18a, 18n.

In the present description, the secondary windings have been referred to as single turns, i.e. having a 1:1 turns ratio with respect to the primary windings, which is the preferable implementation according to the present invention. It will, however, be appreciated that the limiting factor is the AC voltage level produced in the secondary windings, and therefore each single turn may be replaced by a small number of turns provided the secondary AC voltage is limited to a value less than the Paschen minimum voltage, i.e. approximately 300 volts for air. In most applications, one turn on the secondary coil combined with doubling action of the rectifier element is sufficient.

Figure 3:
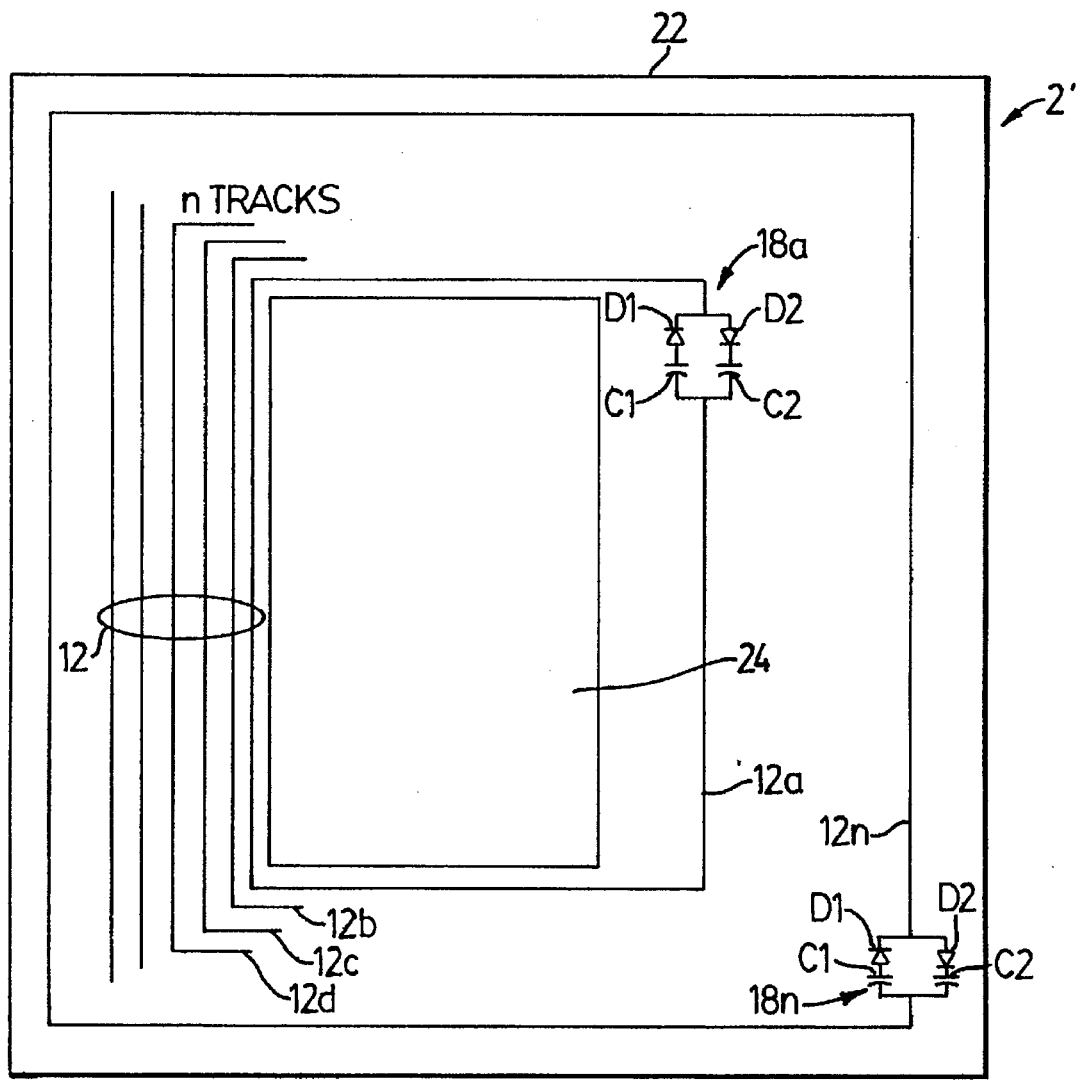
FIG. 3 is a schematic diagram of another embodiment of a high voltage power supply of FIG. 1.

Reference is next made to FIG. 3, which shows another arrangement for the high voltage power supply 2 of the FIG. 2. For the high voltage power supply shown in FIG. 3 and denoted by 2', the rectifier stages 18a to 18n are placed in respective portions of the secondary coils 12a to 12n which are located away from the magnetic circuit. The magnetic circuit (not shown) is mounted in an aperture or window 24 formed by the arrangement of secondary coils 12a to 12n on the substrate 22.

Surrounding the secondary coils with an insulating oil or other substance such as sulphur hexaflouride can increase the insulation strength between the secondary coils and also provide better cooling.

Figure 4:
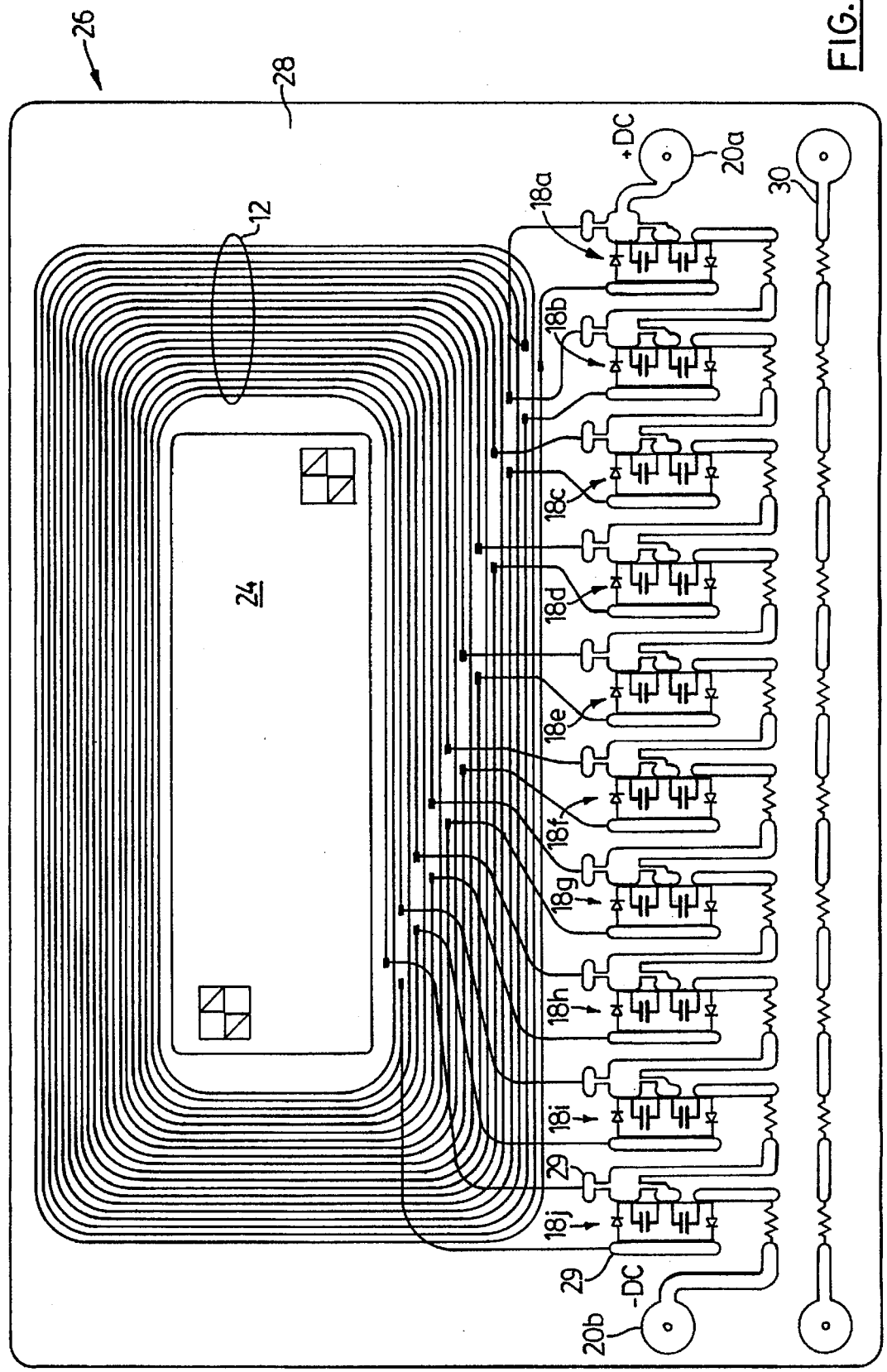
FIG. 4 is a schematic diagram of a printed circuit board implementation of the high voltage power supply of FIG. 1.

Reference is made to FIG. 4 which shows a layout 26 for the high voltage power supply 2' (FIG. 3) on a printed circuit board 28. The large number of low voltage components, i.e. diodes D1, D2 and capacitors C1, C2, combined with the arrangement of secondary coils 12 make the supply 2' suitable for layout on a printed circuit board 28. The printed circuit board 28 comprises a two-sided board. The secondary coils 12 are located on the lower side of the board 28 and connected to component mounting pads 29, for the diodes D1, D2 and capacitors C1, C2, by through-plated holes. In the layout 26, adjacent rectifier stages, e.g. 18a and 18b, are connected through a resistor R1 which provides protection against large currents. Other forms of overload protection may be used, and in the alternative current limiting can be incorporated into the design of the magnetic circuit as will be within the understanding of those skilled in the art. The layout 26 shown in FIG. 4 also includes a rail 30 for providing a split-supply output.

The high voltage power supply 2 shown in FIG. 2 is suitable for applications where axial symmetry is desirable, for example, in an integrated X-Ray power supply. For such an application, a minimum DC output voltage of approximately 60 kV at 50 mA is desirable. The arrangement shown in FIG. 3 is suitable for applications where a compact and very low reluctance magnetic circuit is required.

Figure 5:
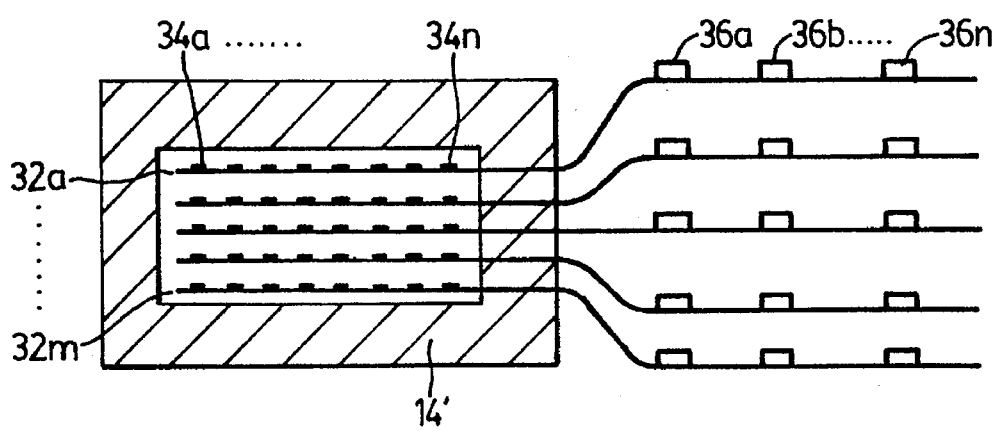
FIG. 5 is a schematic diagram showing a multiple array arrangement for the high voltage power supply of FIG. 2 or FIG. 3.

Each stage or array of secondary coils 12 (FIGS. 2 and 3) produces a DC voltage of a few kilovolts DC. An arrangement for producing higher DC voltages, for example a minimum DC output voltage of 300 kV, is shown in FIG. 5. The high voltage power supply 4 shown in FIG. 5 comprises a stack of secondary coil arrays 32a to 32m. Each secondary coil array 32a includes a series of n coils or tracks 34a to 34n, and each coil 34 includes a rectifier element or stage 36 as described above. The secondary coil arrays 32a to 32m are arranged to receive flux from a suitable magnetic circuit 14'. The outputs of each array 32 are connected in series to provide the desired high voltage DC output and polarity.

Figure 6:
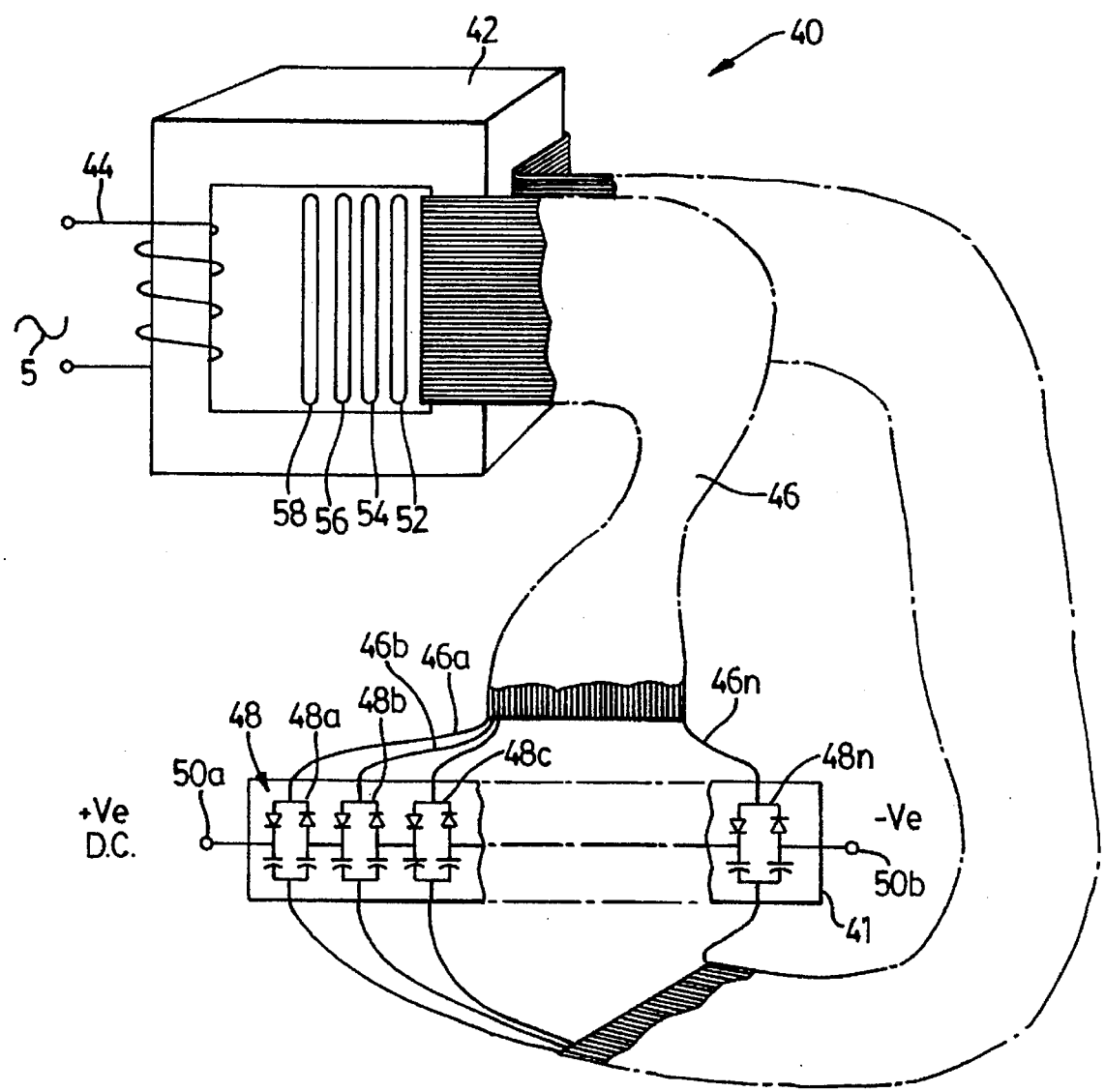
FIG. 6 shows another embodiment of a high voltage power supply according to the present invention.

Reference is next made to FIG. 6 which shows another embodiment of a high voltage power supply 40 according to the present invention. The power supply 40 comprises a magnetic core 42 having a primary winding 44 and a secondary winding 46. A rectifier stage 48 is coupled to the secondary 46 and provides positive and negative output terminals 50a, 50b for the DC output.

The primary winding 44 is connected to an AC supply (not shown) for receiving an AC voltage signal 52. The secondary winding 46 comprises a multi-conductor ribbon cable such as the type common in computer connections. The rectifier stage 48 comprises rectifier units 48a, 48b to 48n for each respective conductor 46a, 46b to 46n in a ribbon cable 46 have n-conductors. The rectifier units 48a to 48n are connected in series and the first rectifier unit 48a provides a positive output terminal 50a and the n-th unit 48n provides a negative output terminal 50b. Each rectifier unit 48a to 48n preferably comprises a voltage doubler circuit as described above. The rectifier units 48a to 48n can be located away from the magnetic core 42 for example on another printed circuit board denoted by 41.

The arrangement shown in FIG. 6 is suitable where it is desirable to mount the rectifier units 48 away from the magnetic core 42. Because the voltage in each secondary coil 46a, 46b to 48n is kept below the Paschen minimum voltage, it is possible to use a secondary coil with little inter-winding insulation. Ribbon cable provides an inexpensive implementation for the power supply 40 of the present invention. The arrangement shown in FIG. 6 may also be utilized in a practical implementation of the configuration described above with reference to FIG. 5.

The DC voltage output produced by the high voltage power supply 40 of FIG. 6 is increased by including additional secondary coils 52,54,56 which are inductively coupled to the magnetic core 42. The secondary coils 52,54,56, shown in partial cut-away form in FIG. 6, are formed from ribbon cable and include respective rectifier stages mounted on respective printed circuit boards (not shown) which are connected in series to produce a higher DC output voltage.

Figure 7:
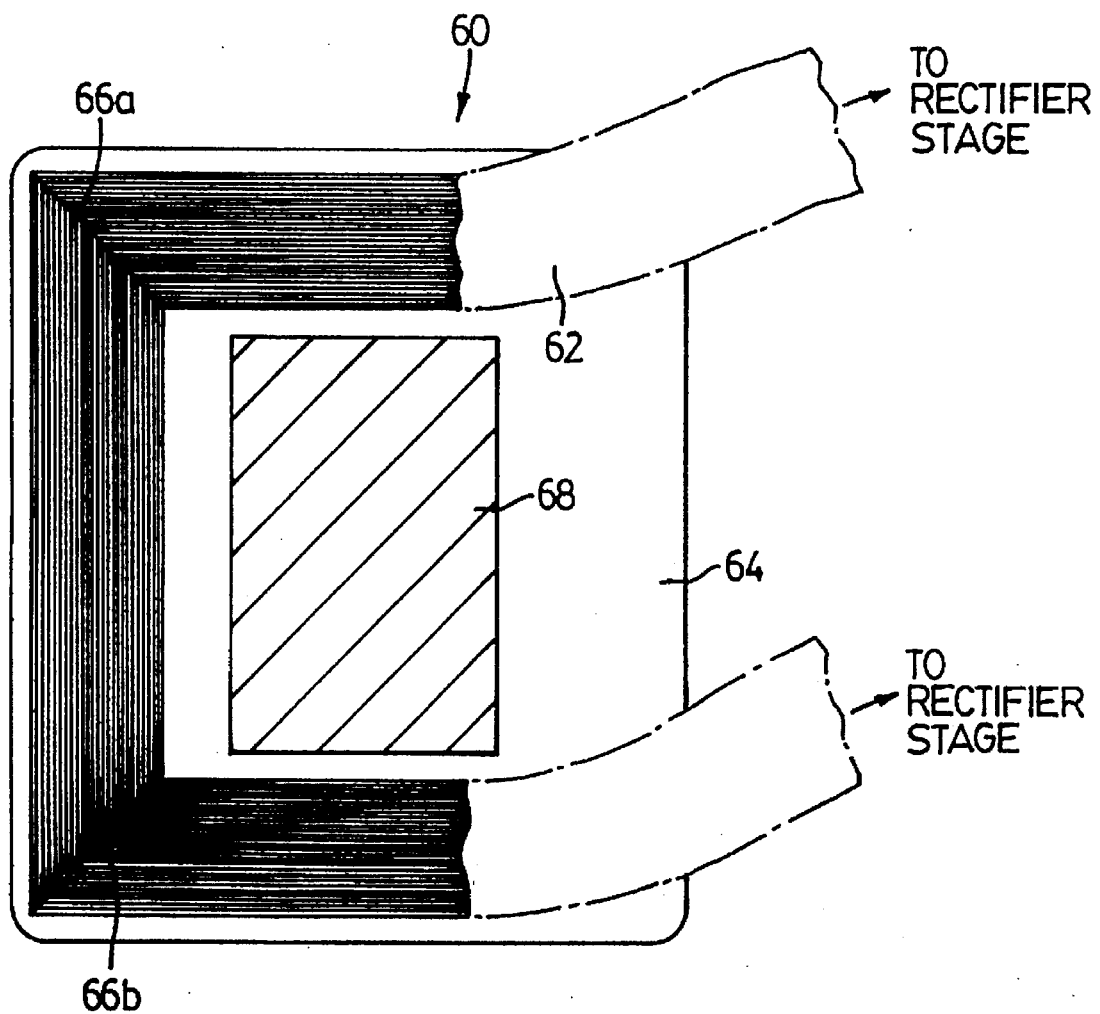
FIG. 7 is a schematic diagram of another embodiment of the high voltage supply of FIG. 6.

In another aspect, the high voltage power supply 40 is modified as shown in FIG. 7. FIG. 7 shows a high voltage power supply 60 in which the secondary coil is formed from a multi-conductor ribbon cable 62 which is mounted flat on a printed circuit board 64. The cable 62 is folded flat at corners 64a, 64b so that flux from the magnetic core 66 is passed to the cable 62. The ends of the cable 62 connect to a rectifier stage (not shown). The DC output voltage from the high voltage power supply 60 can be increased by stacking secondary coils and rectifier stages as described above with reference to FIG. 6.

The high voltage power supply according to the present invention is suitable for many applications where compactness, lack of discharges and economic advantage are important. Improved reliability from the elimination of discharges and the capability to handle large currents makes the power supply of the invention suitable for a range of output levels including 1 MegaVolt (30 kilowatts), 300 kV (50 kW), 100 kV (10 kW), 60 kV (3 kW), 24 kV (100 kW), and 6 kV (30 kW). The elimination of discharges according to the present invention also makes the power supply suitable for DC supplies with a high frequency stage, but low power output.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for generating a DC output voltage in an environment subject to inclusion of a gaseous medium having a Paschen minimum voltage level and wherein the DC output voltage is substantially greater than the Paschen minimum voltage for the medium, said apparatus comprising:

(a) a primary winding having an input port for receiving an alternating voltage;

(b) a secondary winding inductively coupled to said primary winding;

(c) induction means coupled to said primary and secondary windings for inducing a voltage in said secondary winding in response to excitation of said primary winding by said alternating voltage;

(d) said secondary winding comprising a plurality of coils and each of said coils having a turns ratio for producing an induced voltage less than the Paschen minimum voltage;

(e) a rectifier element connected to each of said coils for converting said induced voltage into a DC voltage component; and (f) said rectifier elements being coupled to produce a DC output voltage by summing a plurality of said DC voltage components.

2. The apparatus as claimed in claim 1, wherein said medium comprises air having a Paschen minimum voltage of approximately 385 Volts.

3. The apparatus as claimed in claim 2, wherein said DC output voltage has a magnitude approximately at least 10 times said Paschen minimum voltage.

4. The apparatus as claimed in claim 1, wherein said DC output voltage has a magnitude approximately at least 1000 times said Paschen minimum voltage.

5. The apparatus as claimed in claim 1, further including a substrate and said coils being fixed to said substrate.

6. The apparatus as claimed in claim 5, wherein said substrate comprises a printed circuit board and said coils are formed as conductor tracks on said board.

7. The apparatus as claimed in claim 1, wherein said secondary comprises a ribbon cable having a plurality of conductors and each of said conductors forming one of said coils.

8. The apparatus as claimed in claim 7, wherein said rectifier element comprises a voltage doubler circuit.

9. The apparatus as claimed in claim 8, wherein said induction means comprises a magnetic core.

10. The apparatus as claimed in claim 1, wherein said secondary winding comprises two or more arrays of coils and each of said coils having a turns ratio for producing an induced voltage no more than the Paschen minimum voltage.

11. An apparatus for generating a DC output voltage in an environment subject to inclusion of a gaseous medium having a Paschen minimum voltage level, said apparatus comprising:

(a) a primary winding having an input port for receiving an alternating voltage;

(b) a secondary winding inductively coupled to said primary winding;

(c) a planar member;

(d) induction means coupled to said primary and secondary windings for inducing a voltage in said secondary winding in response to excitation of said primary winding by said alternating voltage, said induction means being located on a surface of said planar member;

(e) said secondary winding comprising a plurality of coils formed on a surface of said planar member, and each of said coils having a turns ratio for producing an induced voltage no more than the Paschen minimum voltage;

(f) a rectifier element connected to each of said coils for converting said induced voltage into a DC voltage component; and (g) said rectifier elements being coupled to produce at an output port a DC output voltage by summing a plurality of said DC voltage components.

12. The apparatus as claimed in claim 11, wherein said planar member comprises a two-sided printed circuit board, and said coils comprise tracks formed on one side of said board and said rectifier elements being mounted on the other side of said board and electrically connected to said respective coils.

13. The apparatus as claimed in claim 11, further including a second planar member for mounting said rectifier elements and said rectifier elements being electrically connected to said respective coils.

14. The apparatus as claimed in claim 12, wherein said medium is air and the Paschen minimum voltage is of approximately 385 Volts.

15. The apparatus as claimed in claim 11, wherein said DC output voltage produced has a magnitude of at least 6 kilovolts.

16. An apparatus for generating a DC output voltage in an environment subject to inclusion of a gaseous medium having a Paschen minimum voltage level, said apparatus comprising:

(a) a substrate;

(b) a plurality of coils formed on a surface of said substrate;

(c) said substrate including means for attaching a magnetic core having a primary winding for inductively coupling to said coils so that a voltage is induced in said coils in response to excitation of said primary winding by an alternating voltage;

(d) each of said coils having a turns ratio wherein said induced voltage is no more than the Paschen minimum voltage;

(e) a rectifier element connected to each of said coils for converting said induced voltage into a DC voltage component; and (f) said rectifier elements being coupled to produce a DC output voltage at an output port by summing a plurality of said DC voltage components.

17. The apparatus as claimed in claim 16, wherein said substrate comprises a two-sided printed circuit board, and said coils comprise tracks formed on one side of said board and said rectifier elements being mounted on the other side of said board and electrically connected to said respective coils.

18. The apparatus as claimed in claim 16, further including a second substrate for mounting said rectifier elements and said rectifier elements being electrically connected to said respective coils.

19. The apparatus as claimed in claim 17, wherein said medium is air and the Paschen minimum voltage is of approximately 385 Volts.

20. The apparatus as claimed in claim 16, wherein said DC output voltage produced has a magnitude of at least 6 kilovolts.

* * * * *